United States Patent
Anand et al.

(10) Patent No.: US 7,912,523 B2
(45) Date of Patent: Mar. 22, 2011

(54) CRESCENT HINGE

(75) Inventors: Vaibhava Anand, Kamataka (IN); Deepak Saini, Bangalore (IN)

(73) Assignee: Kyocera Corporation, Kyoto (JP)

( * ) Notice: Subject to any disclaimer, the term of this patent is extended or adjusted under 35 U.S.C. 154(b) by 496 days.

(21) Appl. No.: 12/141,762

(22) Filed: Jun. 18, 2008

(65) Prior Publication Data
US 2009/0318203 A1    Dec. 24, 2009

(51) Int. Cl.
*H04M 1/00* (2006.01)

(52) U.S. Cl. ............... 455/575.3; 455/575.1; 455/90.3; 455/347; 455/349; 379/433.01; 379/433.11; 379/433.13; 16/221; 16/343; 16/345

(58) Field of Classification Search ............... 455/575.1, 455/575.3, 90.3, 347–349, 556.1–556.2; 379/433.01, 433.11, 433.13; 16/352, 343, 16/345, 346, 347, 221, 225, 239, 240, 241; D14/138 AB
See application file for complete search history.

(56) References Cited

U.S. PATENT DOCUMENTS

| | | | |
|---|---|---|---|
| 6,678,539 B1 * | 1/2004 | Lu | 455/575.1 |
| 6,963,766 B2 * | 11/2005 | Jung | 455/575.3 |
| 7,085,375 B2 * | 8/2006 | Katoh | 379/433.13 |
| 7,168,135 B2 * | 1/2007 | Jung et al. | 16/367 |
| 7,334,296 B2 * | 2/2008 | Park | 16/330 |
| 7,346,377 B2 * | 3/2008 | Sakai et al. | 455/575.3 |
| 7,386,330 B2 * | 6/2008 | Takagi | 455/575.3 |
| 7,412,270 B2 * | 8/2008 | Takagi | 455/575.1 |
| 7,418,279 B2 * | 8/2008 | Takagi | 455/575.1 |
| 7,499,737 B2 * | 3/2009 | Mizuta et al. | 455/575.3 |
| 7,515,707 B2 * | 4/2009 | Ka et al. | 379/433.12 |
| 7,565,717 B2 * | 7/2009 | Duan et al. | 16/303 |
| 7,610,067 B2 * | 10/2009 | Cho et al. | 455/575.3 |
| 7,681,282 B2 * | 3/2010 | Liu | 16/273 |
| 7,711,112 B2 * | 5/2010 | Satoh et al. | 379/433.13 |
| 7,724,534 B2 * | 5/2010 | Wang et al. | 361/755 |
| 7,725,987 B2 * | 6/2010 | Duan et al. | 16/330 |
| 7,810,214 B2 * | 10/2010 | Feng et al. | 16/348 |

* cited by examiner

*Primary Examiner* — Tuan A Tran

(57) ABSTRACT

A portable electronic device includes a base or first member, a flip or second member, and a hinge mechanism pivotally connecting the second member to the first member for pivotal movement between a closed position and an open position. The hinge mechanism includes a first semi-annular elongated recess and a semi-annular elongated concave member with a semi-annular elongated concave surface, the semi-annular elongated rotation member being pivotally and slidably disposed within the first semi-annular elongated recess, and the semi-annular elongated concave surface of the semi-annular elongated rotation member being exposed when the first member and the second member are in the closed position and being not exposed when the first member and the second member are in the open position.

10 Claims, 3 Drawing Sheets

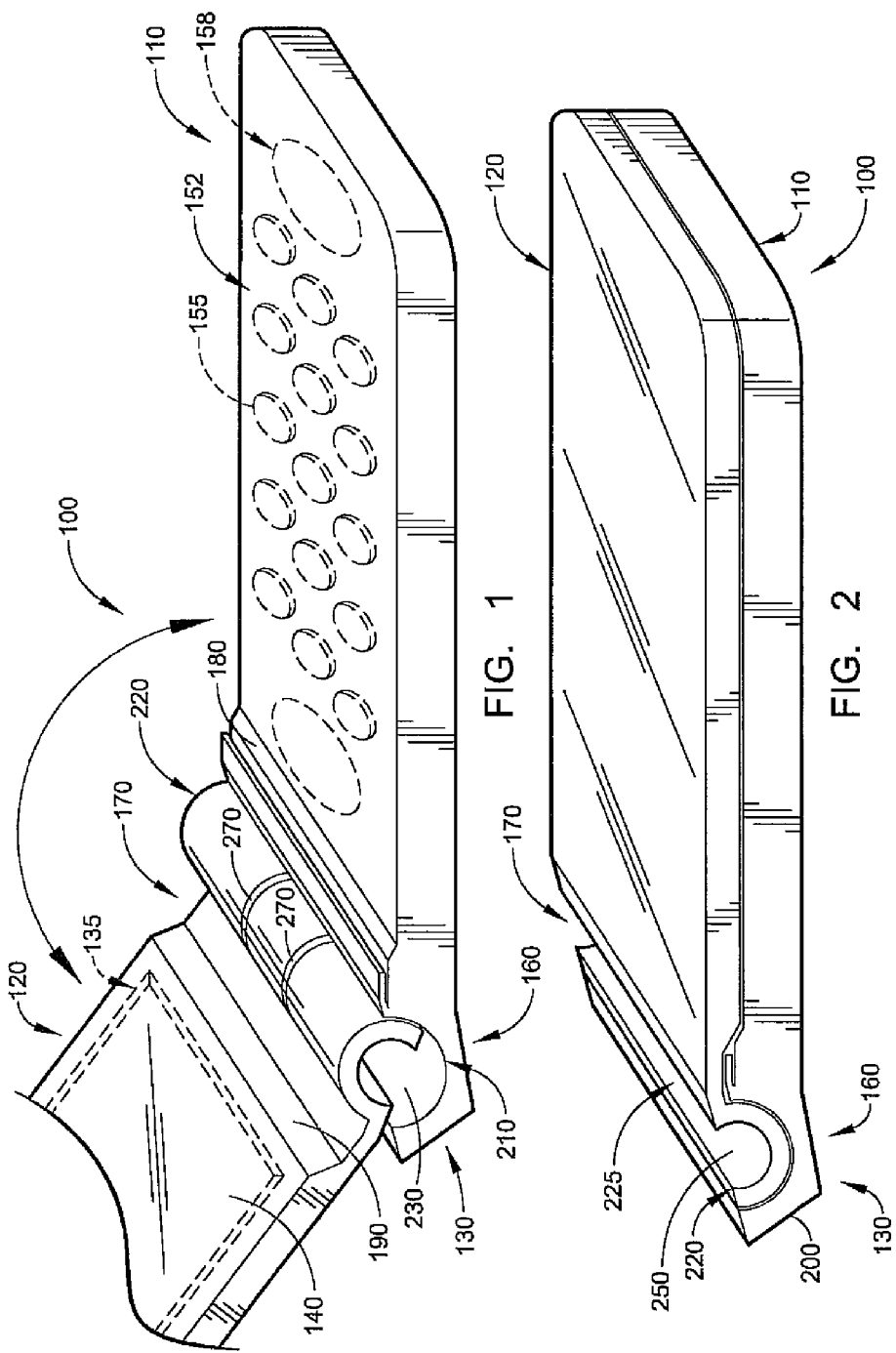

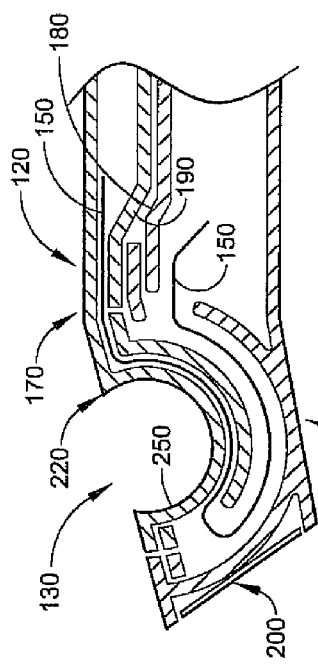
FIG. 3
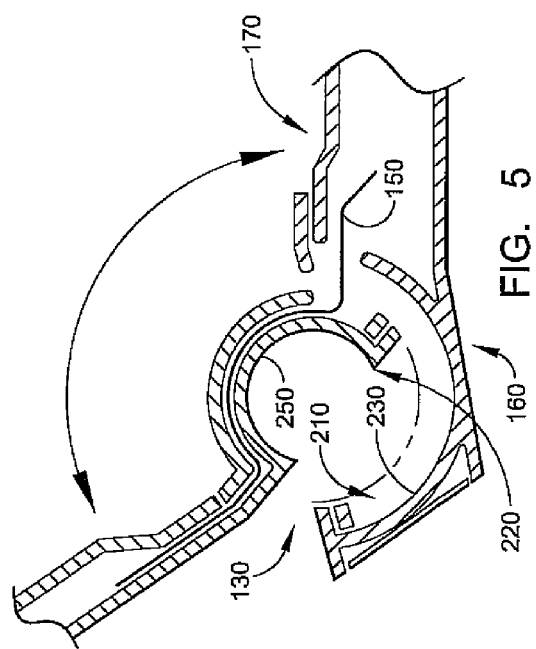
FIG. 4
FIG. 5

CRESCENT HINGE

FIELD OF THE INVENTION

The present invention relates, in general, to portable electronic devices including first and second members pivotally connected together, and, in particular, to flip-phone or clamshell type wireless communication devices.

BACKGROUND

Flip phone or clamshell wireless communication devices are popular type of wireless communication device (e.g., cell phone). A flip phone includes a base and a flip pivotally connected to each other via a hinge having an axial support. To open the flip phone (e.g., to make a call or take an incoming call), the flip is rotated upward, away from the base, about the axial support of the hinge. To close the flip phone (e.g., after ending a call), the flip is rotated toward the base, about the axial support of the hinge, until the face of the flip and the face of the base come together.

SUMMARY

An aspect of the invention involves a portable electronic device including a new hinge mechanism for pivotally connecting a base or first member to a flip or second member. The portable electronic device includes a first member having a front with a display; a second member having a front with one or more input keys; and a hinge mechanism pivotally connecting the second member to the first member for pivotal movement between a closed position where the front of the second member is adjacent to and directly opposes the front of the first member, and an open position where the front of the first member and the front of the second member generally face in the same direction. The hinge mechanism includes a first semi-annular elongated recess and a semi-annular elongated concave member with a semi-annular elongated concave surface, the semi-annular elongated rotation member being pivotally and slidably disposed within the first semi-annular elongated recess, and the semi-annular elongated concave surface of the semi-annular elongated rotation member being exposed when the first member and the second member are in the closed position and being not exposed when the first member and the second member are in the open position.

Another aspect of the invention involves a method of using a portable electronic device, the portable electronic device including a first member including a front with a display, a second member including a front with one or more input keys, and a hinge mechanism pivotally connecting the second member to the first member, the hinge mechanism including a first semi-annular elongated recess and a semi-annular elongated concave member with a semi-annular elongated concave surface, the semi-annular elongated rotation member pivotally and slidably disposed within the first semi-annular elongated recess. The method includes opening the portable electronic device, based on user input, by pivoting the second member to an open position relative to the first member via the semi-annular elongated rotation member pivoting within the first semi-annular elongated recess, wherein in the open position the front of the first member and the front of the second member generally face in the same direction and the semi-annular elongated concave surface of the semi-annular elongated rotation member is not exposed; and closing the portable electronic device, based on user input, by pivoting the second member to a closed position relative to the first member via the semi-annular elongated rotation member pivoting within the first semi-annular elongated recess, wherein in the closed position the front of the second member is adjacent to and directly opposes the front of the first member and the semi-annular elongated concave surface of the semi-annular elongated concave member is exposed.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which:

FIG. 1 is a front perspective view of the portable electronic device with the portable electronic device shown in an open condition.

FIG. 2 is a front perspective view of the portable electronic device illustrated in FIG. 1 with the portable electronic device shown in a closed condition.

FIG. 3 is a top partial view of the portable electronic device illustrated in FIG. 1 and illustrates a hinge mechanism constructed in accordance with an embodiment of the invention.

FIG. 4 is a cross-sectional view of the hinge mechanism taken along lines 4-4 of FIG. 3 and shows the hinge mechanism and the portable electronic device in a closed condition and illustrates a data cable that extends through the hinge mechanism.

FIG. 5 is a cross-sectional view, similar to FIG. 4, and shows the hinge mechanism and the portable electronic device in an open condition and illustrates a data cable that extends through the hinge mechanism.

DETAILED DESCRIPTION

Figure 7:
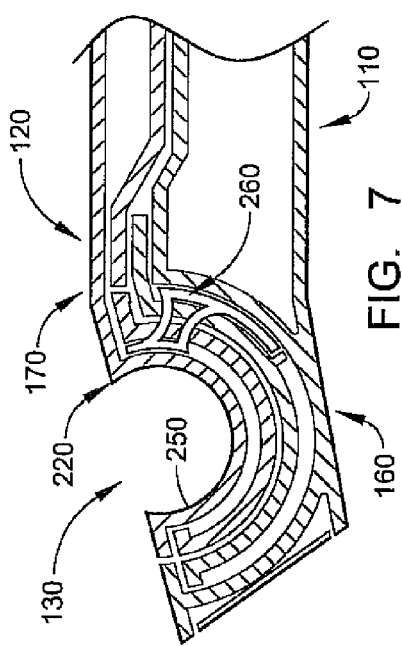
FIG. 7 is a cross-sectional view of the hinge mechanism taken along lines 7-7 of FIG. 3 and shows the hinge mechanism and the portable electronic device in a closed condition.
Figure 8:
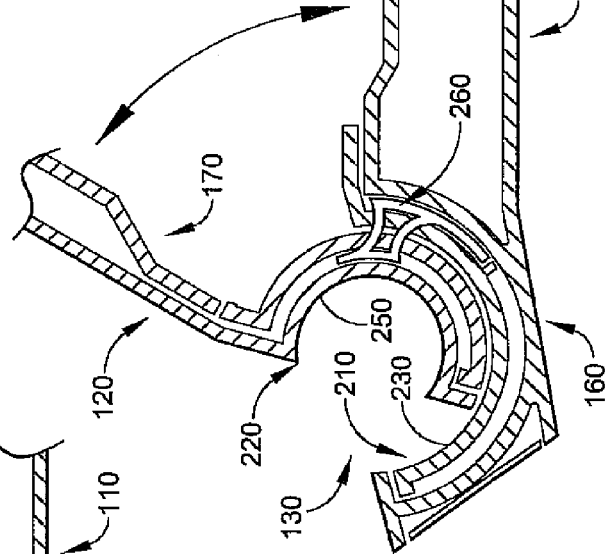
FIG. 8 is a cross-sectional view, similar to FIG. 7, and shows the hinge mechanism and the portable electronic device in a partially open condition.

With reference to FIGS. 1-8, an embodiment of portable electronic device 100 including a hinge mechanism constructed in accordance with an embodiment of the invention will be described. Although portable electronic device 100 is shown and described as being a flip phone or clamshell wireless communication device, in alternative embodiments, portable electronic device 100 is a portable electronic device other than a wireless communication device. For example, but not by way of limitation, in an alternative embodiment, portable electronic device 100 is a PDA.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Portable electronic device 100 includes base or first member ("base") 110 and flip or second member ("flip") 120 pivotally connected together via hinge mechanism 130. Flip 120 of portable electronic device 100 includes front 135 with display/monitor/screen ("display") 140 that is coupled to electronics within base 110 via one or more data cables 150 (FIGS. 4, 5). Base 110 includes front 152 with a variety of input keys 155 (e.g., numeric keypad keys) that are used for inputting data into portable electronic device 100. Base includes microphone 158. Although not shown, portable electronic device 100 includes a speaker, an antenna, and appropriate electronic circuitry and/or software for controlling the wireless functions and other functions described herein.

Both base 110 and flip 120 include respective connection sections 160, 170 adjacent hinge mechanism 130 that have a bent profile (see FIGS. 4, 7) relative to the remainder of base 110 and flip 120. Connections sections 160, 170 include respective opposing angled face sections 180, 190. Base 110 terminates in angled end 200.

Hinge mechanism 130 is located in connection sections 160, 170 of base 110 and flip 120. Hinge mechanism 130 includes first semi-annular elongated recess 210 in connection section 160 of base 110 and semi-annular elongated rotation member 220, which forms second semi-annular elongated recess 225. Second semi-annular elongated recess 225 extends laterally across a rear of the flip 120, from one side to an opposite side. Flip 120 terminates in semi-annular elongated rotation member 220. Semi-annular elongated recess 21 0 and semi-annular elongated recess 225 include a radius of curvature that is substantially the same. First semi-annular elongated recess 210 is defined by first semi-annular concave elongated surface 230. Semi-annular elongated rotation member 220 includes outer convex elongated surface 240 slidably disposed within first semi-annular concave elongated surface 230. Semi-annular elongated rotation member 220 includes second semi-annular inner concave elongated surface 250. Second semi-annular elongated recess 225 is defined by second semi-annular concave elongated surface 250.

As used herein, "semi-annular" means partially annular (i.e., less than a full circle). As shown in the drawings, the semi-annular elements have substantially half circle cross-sections. In alternative embodiments, one or more elements of the hinge mechanism include semi-annular elements with cross sections (e.g., penannular, partially annular) that are other than half circles.

As shown in FIGS. 4 and 5, data cable(s) 150 extend from inside base 110, between outer convex elongated surface 240 and first semi-annular concave elongated surface 230, and into flip 120.

Figure 6:
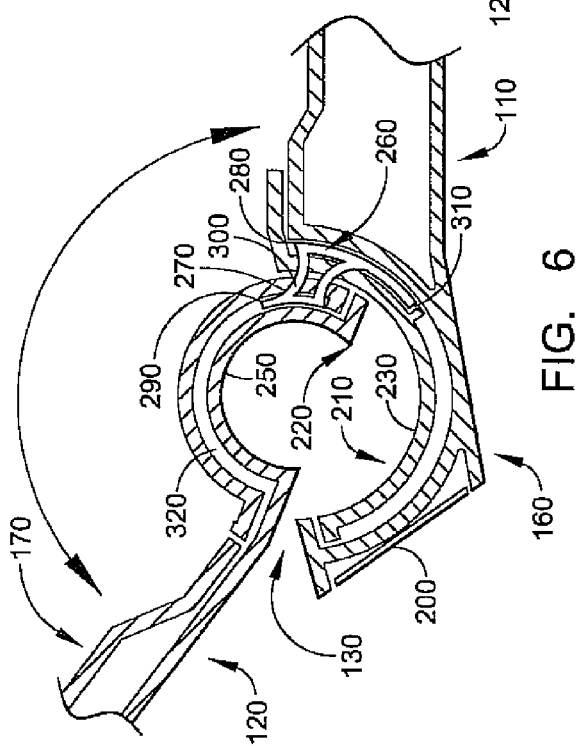
FIG. 6 is a cross-sectional view, similar to FIGS. 4 and 5, and shows the hinge mechanism and the portable electronic device in an open condition.

With reference to FIGS. 4-6, semi-annular elongated rotation member 220 is pivotally and slidably connected to base connection section 160, within semi-annular elongated recess 210, via one or more jockey(s) 260 and slide slot(s) 270. Jockey 260 forms a sliding mechanism that includes base member 280 and retaining member 290 connected via slide member 300. Connection section 160 of base 110 includes retaining section 310 that houses and retains base member 280 of jockey 260. Semi-annular elongated rotation member 220 includes a semi-annular slide pocket 320 that slidably receives retaining member 290 of jockey 260. During pivot and sliding movement of semi-annular elongated rotation member 220 relative to semi-annular elongated recess 210, slide slot 270 of semi-annular elongated rotation member 220 slides over and relative to slide member 300 of jockey 260. Retaining member 290 includes a width that is wider than slide slot 270, causing retaining member 290 to be retained within semi-annular slide pocket 320 as semi-annular elongated rotation member 220 pivots and slides relative to semi-annular elongated recess 210.

In an alternative embodiment, hinge mechanism 130 includes a single jockey 260 and single slot 270 in a central part of semi-annular elongated rotation member 220. In further embodiments, the hinge mechanism includes one or more jockeys 260 and/or slots 270 at one or more locations other than those described herein.

In a further embodiment, connection section 160 includes jockeys 260 disposed at opposite ends of connection section 160 with retaining members 290 that extend inwardly (into semi-annular slide pocket 320) to retain semi-annular elongated rotation member 220 to semi-annular slide pocket 320.

In a still further embodiment, second inner concave elongated surface 250 is made of a flexible material and/or includes a flexible material liner and is configured to receive an instrument such as, but not limited to, a stylus, a pen, and a pencil.

With reference to FIGS. 1 and 6-8, in use, to open portable electronic device 100, flip 120 is pivotally slid relative to base 110 from the position shown in FIGS. 2 and 7 to the position shown in FIGS. 1 and 6. As flip 120 is moved from the closed position to the open position relative to base 110, slide slot 270 of semi-annular elongated rotation member 220 slides over and relative to slide member 300 of jockey 260. As this pivotal sliding movement occurs, retaining member 290 of jockey 260 retains semi-annular elongated rotation member 220 to semi-annular slide pocket 320. In the open position, front 135 of flip 120 and front 152 of base 110 generally face in the same direction (e.g., towards the user). In the open position, second inner concave elongated surface 250 faces the is not exposed; second inner concave elongated surface 250 and first inner concave elongated surface 250 together form a substantially cylindrical void.

The portable electronic device 100 is closed in an opposite manner to that described above. Flip 120 is pivotally slid relative to base 110 from the open position shown in FIGS. 1 and 6 to the closed position shown in FIGS. 2 and 7. As flip 120 is moved from the open position to the closed position relative to base 110, slide slot 270 of semi-annular elongated rotation member 220 slides over and relative to slide member 300 of jockey 260. As this pivotal sliding movement occurs, retaining member 290 of jockey 260 retains semi-annular elongated rotation member 220 to semi-annular slide pocket 320. In the closed position, front 135 of flip 120 is adjacent to and directly opposes front 152 of base 110 and second semi-annular elongated recess 225 coincides with, is coaxial with, and is recessed within, and is concave in the same direction as first semi-annular elongated recess 210. In the closed position, the second inner concave elongated surface 250 is exposed as shown in FIG. 2.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

What is claimed is:

1. A portable electronic device, comprising;
a first member including a front with a display;
a second member including a front with one or more input keys; and
a hinge mechanism pivotally connecting the second member to the first member for pivotal movement between a closed position where the front of the second member is adjacent to and directly opposes the front of the first member, and an open position where the front of the first member and the front of the second member generally face in the same direction, the hinge mechanism including a first semi-annular elongated recess and a semi-annular elongated concave member with a semi-annular elongated concave surface, the semi-annular elongated rotation member being pivotally and slidably disposed within the first semi-annular elongated recess, and the semi-annular elongated concave surface of the semi-annular elongated rotation member being exposed when the first member and the second member are in the closed position and being not exposed when the first member and the second member are in the open position.

2. The portable electronic device of claim 1, wherein the hinge mechanism includes one or more sliding mechanisms and one or more slide slots, the one or more slide slots slidably disposed over the one or more sliding mechanisms to pivotally and slidably dispose the semi-annular elongated rotation member within the semi-annular elongated recess.

3. The portable electronic device of claim 2, wherein the hinge mechanism includes a retaining section, the semi-annular elongated rotation member includes a semi-annular slide pocket, the one or more sliding mechanisms include a base member, a slide member, and a retaining member, the base member is retained within the retaining section, the retaining member is slidably disposed within the semi-annular slide pocket, and the one or more slide slots are slidably disposed over the one or more slide members of the one or more sliding mechanisms to pivotally and slidably dispose the semi-annular elongated rotation member within the semi-annular elongated recess.

4. The portable electronic device of claim 2, wherein semi-annular elongated concave surface of the semi-annular elongated rotation member forms a second semi-annular elongated recess, and the second semi-annular elongated recess coincides with the first semi-annular elongated recess when the first member and the second member are in the closed position.

5. The portable electronic device of claim 1, wherein the first member includes an angled connection section that the hinge mechanism is disposed within.

6. The portable electronic device of claim 1, wherein the portable electronic device is a clamshell wireless communication device with the first member being a base and the second member being a flip.

7. A method of using a portable electronic device, the portable electronic device including a first member including a front with a display, a second member including a front with one or more input keys, and a hinge mechanism pivotally connecting the second member to the first member, the hinge mechanism including a first semi-annular elongated recess and a semi-annular elongated concave member with a semi-annular elongated concave surface, the semi-annular elongated rotation member being pivotally and slidably disposed within the first semi-annular elongated recess, the method comprising:
opening the portable electronic device, based on user input, by pivoting the second member to an open position relative to the first member via the semi-annular elongated rotation member pivoting within the first semi-annular elongated recess, wherein in the open position the front of the first member and the front of the second member generally face in the same direction and the semi-annular elongated concave surface of the semi-annular elongated rotation member is not exposed; and
closing the portable electronic device, based on user input, by pivoting the second member to a closed position relative to the first member via the semi-annular elongated rotation member pivoting within the first semi-annular elongated recess, wherein in the closed position the front of the second member is adjacent to and directly opposes the front of the first member and the semi-annular elongated concave surface of the semi-annular elongated concave member is exposed.

8. The method of claim 7, wherein the hinge mechanism includes one or more sliding mechanisms and one or more slide slots, the one or more slide slots slidably disposed over the one or more sliding mechanisms to pivotally and slidably dispose the semi-annular elongated rotation member within the semi-annular elongated recess, and pivoting includes sliding the one or more slide slots over the one or more sliding mechanisms with the semi-annular elongated rotation member within the semi-annular elongated recess.

9. The method of claim 8, wherein the hinge mechanism includes a retaining section, the semi-annular elongated rotation member includes a semi-annular slide pocket, the one or more sliding mechanisms include a base member, a slide member, and a retaining member, the base member is retained within the retaining section, the retaining member is slidably disposed within the semi-annular slide pocket, and the one or more slide slots are slidably disposed over the one or more slide members of the one or more sliding mechanisms, and pivoting includes sliding the one or more slide slots over the one or more slide members of the one or more sliding mechanisms while sliding the semi-annular slide pocket over the one or more retaining members of the one or more sliding mechanisms with the semi-annular elongated rotation member within the semi-annular elongated recess.

10. The method of claim 7, wherein semi-annular elongated concave surface of the semi-annular elongated rotation member forms a second semi-annular elongated recess, and the second semi-annular elongated recess coincides with the first semi-annular elongated recess when the first member and the second member are in the closed position.

* * * * *